Dec. 3, 1929.  O. W. SIEBERT  1,737,618
CHILD'S VEHICLE
Filed Jan. 13, 1926   2 Sheets-Sheet 1

Dec. 3, 1929.          O. W. SIEBERT          1,737,618
CHILD'S VEHICLE
Filed Jan. 13, 1926          2 Sheets-Sheet 2
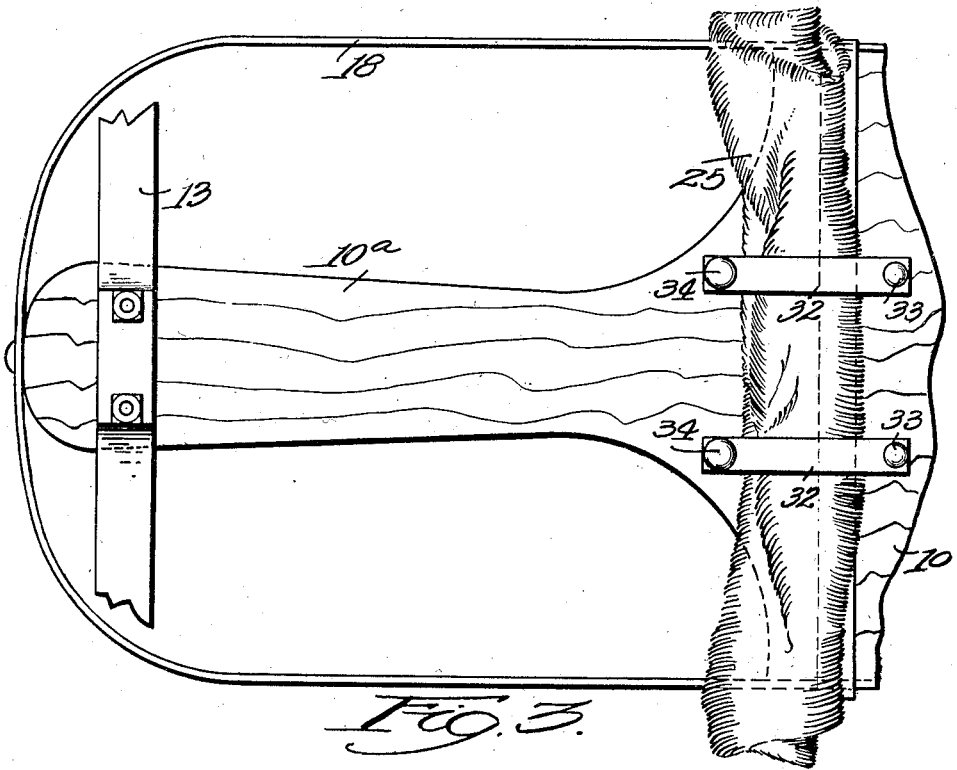
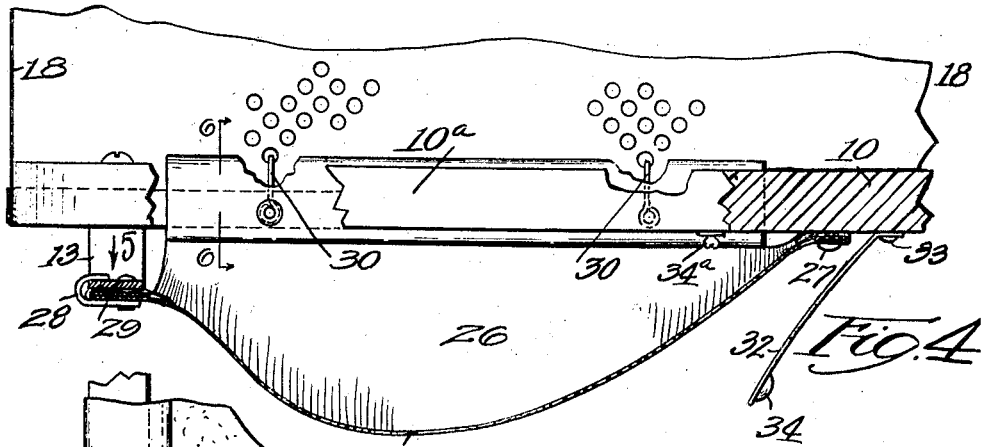
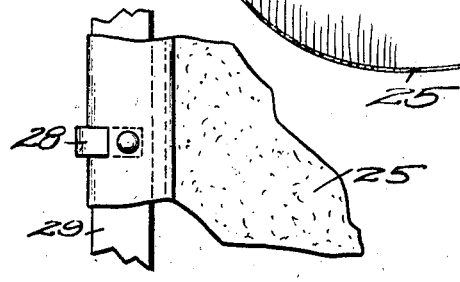

Patented Dec. 3, 1929

1,737,618

UNITED STATES PATENT OFFICE

OTTO W. SIEBERT, OF GARDNER, MASSACHUSETTS, ASSIGNOR TO O. W. SIEBERT COMPANY, OF GARDNER, MASSACHUSETTS, A CORPORATION OF MASSACHUSETTS

CHILD'S VEHICLE

Application filed January 13, 1926. Serial No. 80,974.

This invention relates to a child's vehicle which may be used both as a cart for drawing a baby or small child and also as a baby walker of the general type commonly known as "kiddie-cars".

It is the object of my invention to provide an improved construction by which the vehicle may be readily adapted to either use and may be easily and quickly changed from one form to the other.

More specifically, I preferably provide a foldable or collapsible bottom portion or foot well which may be extended and secured in operative position, or which may be folded and secured in inoperative position.

My invention further relates to details of the body construction and to other arrangements and combinations of parts which will be hereinafter described and more particularly pointed out in the appended claims.

A preferred form of the invention is shown in the drawings in which

Fig. 3 is an enlarged partial bottom view, showing the foot well or bottom portion folded;

Fig. 4 is an enlarged sectional side elevation, taken along the line 4—4 in Fig. 2 but showing the bottom or foot well in operative position;

Fig. 5 is a detail plan view, looking in the direction of the arrow 5 in Fig. 4; and Fig. 6 is a detail sectional elevation, taken along the line 6—6 in Fig. 4.

Figure 1:
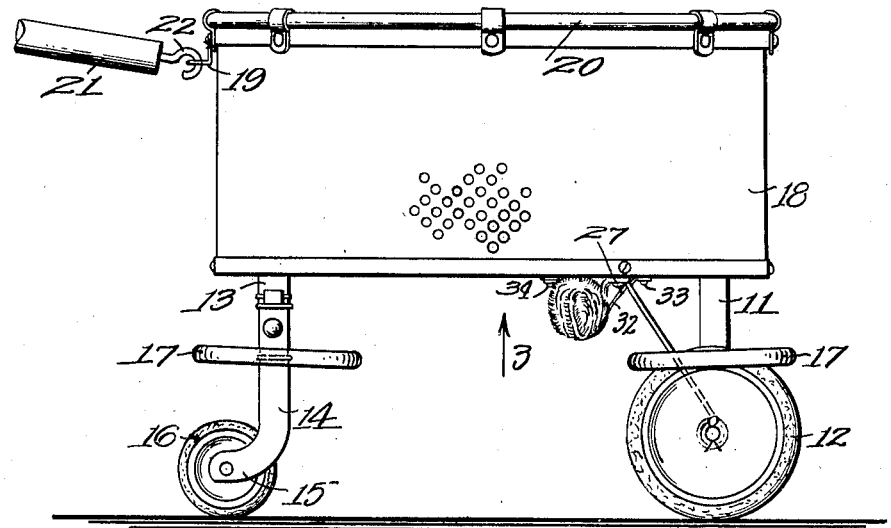
Fig. 1 is a side elevation of my improved vehicle.

Referring to the drawings, I have shown a child's vehicle comprising a seat 10 having a narrow forwardly projecting portion $10^a$ which may be straddled by the child. The seat 10 is supported upon a rear axle or frame 11 having wheels 12 rotatably mounted thereon. The narrow seat portion $10^a$ is similarly supported upon a front axle 13 having vertical swivel posts 14 at its opposite ends. The lower portions of said posts are offset as indicated at 15 and are provided with small wheels 16. These wheels 16 swing about the axes of the posts 14 and permit the car to be guided in a desired direction.

Continuous fenders 17 are provided at each end of the vehicle and these fenders are preferably covered with rubber tubing and effectively prevent injury to furniture or other articles when the vehicle strikes against the same.

A continuous encircling casing or enclosure 18 is firmly fixed to the seat 10 and to the forwardly projecting seat portion $10^a$ and extends upwardly therefrom to form a body which will securely support a small child and prevent escape of the child from the vehicle.

It will be obvious that the casing or enclosure 18 and its upper band or rail 20 may terminate short of the extreme forward portion of the vehicle. That is, the rail 20 may extend transversely of the vehicle at a point just sufficiently in advance of the seat to permit a child to stand, rather than transversely of the vehicle at the extreme forward end of the narrow portion $10^a$. The enclosing portion 18 may, of course, extend completely around the vehicle or may terminate at any point along the enclosing rail 20.

An attaching device 19 is preferably secured to the upper band or rail 20 of the casing 18 and a handle 21 provided with a hook 22 may be easily connected to the member 19 when it is desirable to use the vehicle as a baby carriage or cart and the attendant wishes to draw the same along the street or floor.

The side walls of the casing or body 18 may be formed of any suitable material but are preferably formed of a continuous sheet of perforated metal as indicated in Figs. 1 and 4. This material is strong and durable and permits free access of air to the occupant and the perforations also provide for convenient attachment of the sides of the foot well or bottom portion to be described.

This foot well or bottom portion comprises a bottom member 25 of suitable fabric or other flexible material, together with side walls 26 preferably of similar material, the side walls 26 being firmly united to the bottom member 25 along the adjacent edges thereof.

The rear edge of the bottom member 25 is permanently secured to the under side of the seat 10 in any convenient manner as by fastening devices 27 (Fig. 4). The front edge of the bottom 25 is provided with one or more hooks 28 adapted to be attached to a portion 29 of the front axle 13, and the side walls 26 are also provided with hooks 30 (Figs. 4 and 6) adapted to be inserted in perforations in the side walls of the casing or body portion 18.

Suitable fastening devices are also provided for holding the removable bottom or foot well in inoperative position. In the drawings, I have shown short straps 32 secured at 33 to the under side of the seat 10 and having two-piece snap fasteners 34—34$^a$ for their forward or free ends.

Figure 2:
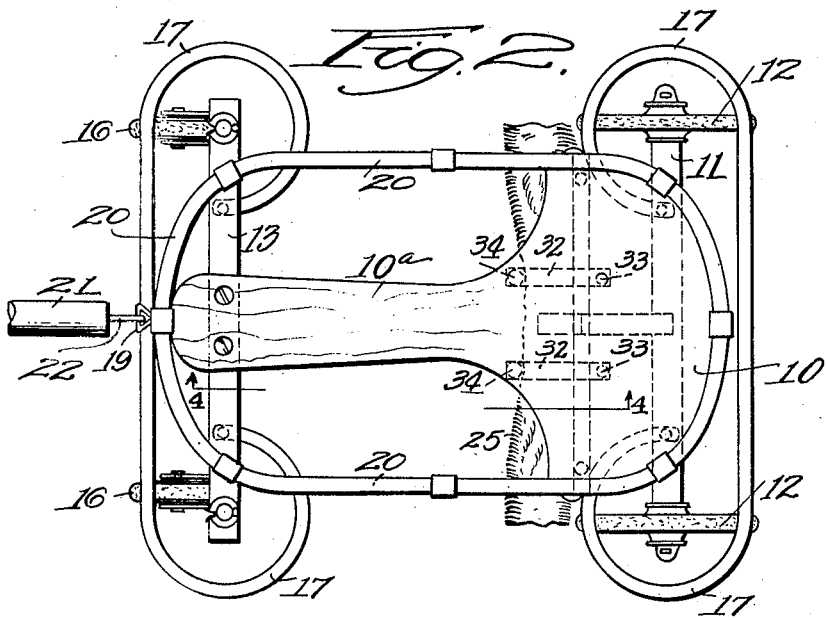
Fig. 2 is a plan view thereof.

When the device is to be used as a baby walker or kiddie-car, the hooks 28 and 30 are released and the bottom is folded back to the position indicated in Figs. 1, 2 and 3, in which position it may be retained by the straps 32. The legs of the child may extend down on both sides of the narrow seat portion 10$^a$ and may contact with the floor or ground so that the vehicle may be propelled as desired by the child seated in the same.

When it is desired to draw the vehicle and child along the street or floor, the bottom 25 is secured in the position indicated in Fig. 4, with the side walls 26 supported by the hooks 30. In this position the feet of the child cannot engage the floor or street and also cannot be pushed out at the sides of the bottom, as this is prevented by the side walls 26. The vehicle is thereafter well adapted for use as a small go-cart or baby carriage, in which a young child may be safely transported.

Having thus described my invention and the advantages thereof, I do not wish to be limited to the details herein disclosed otherwise than as set forth in the claims, but what I claim is:—

1. A child's vehicle having, in combination a seat with a narrow, forwardly projecting portion, a member encircling the child above said seat, a foldable foot well substantially enclosing the space beneath said member and effective to support the feet of a child substantially below said seat when the child is in a sitting position on said seat, and means to secure said foot well in operative foot-supporting position.

2. A child's vehicle having, in combination, a seat with a narrow, forwardly projecting portion, a member encircling the child above said seat, a foldable flexible foot well substantially enclosing the space beneath said member and effective to support the feet of a child substantially below said seat when the child is in a sitting position on said seat, means to secure said foot well in operative position, and additional means to secure said foot well in folded inoperative position, leaving the lower part of the vehicle open.

3. A child's vehicle having a seat with a narrow forwardly projecting portion, a continuous member encircling the child substantially above said seat, a foot well substantially enclosing the space beneath said member and spaced substantially downward therefrom, said foot-well being effective to support the feet of a child substantially below said seat when the child is in a sitting position on said seat, and means to detachably secure said foot well in operative position below said seat, said foot well being readily removable from operative position when not in use.

In testimony whereof I have hereunto affixed my signature.

OTTO W. SIEBERT.